(12) United States Patent
Guelaud et al.

(10) Patent No.: US 10,322,834 B2
(45) Date of Patent: Jun. 18, 2019

(54) POSITIONING AND TRANSFER OF PRODUCTS

(71) Applicant: C.E.R.M.E.X. CONSTRUCTIONS ETUDES ET RECHERCHES DE MATERIELS POUR L'EMBALLAGE D'EXPEDITION, Corcelles-les-Citeaux (FR)

(72) Inventors: Sebastien Guelaud, Corcelles les Citeaux (FR); Arnaud Duvergey, Corcelles les Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 425 days.

(21) Appl. No.: 15/185,783

(22) Filed: Jun. 17, 2016

(65) Prior Publication Data

US 2016/0368636 A1    Dec. 22, 2016

(30) Foreign Application Priority Data

Jun. 18, 2015 (FR) ..................... 15 55566

(51) Int. Cl.
| | |
|---|---|
| *B65B 35/58* | (2006.01) |
| *B65B 59/00* | (2006.01) |
| *B65G 47/90* | (2006.01) |
| *B65B 35/18* | (2006.01) |
| *B65B 35/38* | (2006.01) |
| *B65G 47/91* | (2006.01) |
| *B65B 35/36* | (2006.01) |
| *B65G 47/08* | (2006.01) |

(52) U.S. Cl.
CPC .............. *B65B 35/58* (2013.01); *B65B 35/18* (2013.01); *B65B 35/36* (2013.01); *B65B 35/38* (2013.01);
(Continued)

(58) Field of Classification Search
CPC ......... B65B 35/16; B65B 35/10; B65B 35/36; B65B 35/58; B65B 35/18; B65B 35/38;
(Continued)

(56) References Cited

U.S. PATENT DOCUMENTS 7,690,706 B2 * 4/2010 Wild .................... B65G 47/907
198/468.3
8,353,547 B2 * 1/2013 Maffeis .............. H05K 13/0478
294/65

(Continued)

FOREIGN PATENT DOCUMENTS

EP    0 455 331 A1    11/1991
EP    0 822 058 A2    2/1998
(Continued)

OTHER PUBLICATIONS

French Search Report, dated May 4, 2016, from corresponding French Application.
(Continued)

*Primary Examiner* — David J Walczak
(74) *Attorney, Agent, or Firm* — Young & Thompson (57) ABSTRACT

A positioning device (1) for grasping and modifying the position, within a support structure (2) that includes, a set of products (3) for an industrial line that chain-handles these products (3), a device including, for at least one product (3) to move in the support structure (2), a maneuvering unit (4) including a movable block (5) interacting with the at least one product (3), and an actuator (6) defining the position of the block (5). This at least one maneuvering unit (4) also
(Continued)

includes a pair of adjustment stops (7) between which the block (5) shuttles, under the action of the actuator (6), in such a way as to move the at least one product (3). A gripping device, a positioning process, and a transfer process are also described.

11 Claims, 4 Drawing Sheets

(52) U.S. Cl.
CPC ......... B65B 59/005 (2013.01); B65G 47/082 (2013.01); B65G 47/907 (2013.01); B65G 47/918 (2013.01)

(58) Field of Classification Search
CPC ......... B65B 59/09; B65B 35/56; B65B 59/00; B65G 47/907; B65G 47/918; B65G 47/082; B65G 47/905; B65G 47/901; B65G 47/90; B65G 47/02; B65G 47/04; B65G 47/08
See application file for complete search history.

(56) References Cited

U.S. PATENT DOCUMENTS

| | | | |
|---|---|---|---|
| 8,534,727 B2 * | 9/2013 | Weclawski | B65G 47/918 |
| | | | 198/468.3 |
| 2007/0236029 A1 | 10/2007 | Piccininni | |
| 2013/0299310 A1 | 11/2013 | Begin et al. | |
| 2015/0001867 A1 | 1/2015 | Zhu | |

FOREIGN PATENT DOCUMENTS

| | | |
|---|---|---|
| FR | 2 971 497 A1 | 8/2012 |
| GB | 2 207 413 A | 2/1989 |
| JP | S61-30603 U | 2/1986 |
| JP | S61-110213 A | 5/1986 |
| JP | H11-2545186 A | 9/1999 |

OTHER PUBLICATIONS

French Search Report issued in Application No. 16174490, dated Sep. 26, 2016.

\* cited by examiner

POSITIONING AND TRANSFER OF PRODUCTS

FIELD OF THE INVENTION

This invention pertains to the field of the chain-handling of products in an industrial packaging line and has as its object, on the one hand, a positioning device as well as a gripping device comprising it, and, on the other hand, the processes implementing each of these two devices.

BACKGROUND OF THE INVENTION

In this field, it is necessary to position correctly the products that may be consumables, cases, cardboard sheets, but also the products to be packaged themselves.

The products to be packaged generally circulate via conveyors onto the upper surface of which they are deposited. Once the products are finished, the only thing left to do is to grasp them to deposit them into a case or another carton, during a packing stage.

This situation creates a particular need for positioning the products. Actually, they are generally positioned in a column behind one another before the grasping and may be in contact. Multiple successive products are grasped to be brought into the case, and it is possible that their respective positions are to be adapted to said case, in particular in the cases where it contains spacers or braces. In certain applications, the products that are handled are then simultaneously fed into multiple cases, which can also be different from one another and contain braces. It is then necessary to provide a repositioning of products that takes into account wall thicknesses of the cases.

The relative position of the products is therefore to be changed between the moment of grasping, where they are positioned in accordance with the conveying, and optionally with the upstream stages, and the moment of deposition, where they are positioned in accordance with the scheme to be matched in the case. The gripper that grasps the products to put them into the case is then generally also able to modify the positions of the products for their path between the two zones.

In this particular case of need of changing position between a grasping zone and a deposition zone, for example, FR2971497 is known that proposes a gripping head equipped with a set of blocks each having a gripping means for grasping a product. The blocks can move in the gripping head under the action of a set of actuators, with one actuator per block. The amplitude of the movement of the block between the grasping and the deposition is regulated by adjusting the position of the block along the rod of each actuator.

One of the drawbacks of this installation is that the adjustment is difficult and the head is not very versatile. It is difficult to adapt it to new formats. In addition, each actuator acts between two adjacent blocks in such a way that the adjustment is only relative and therefore not very ergonomic.

There is therefore a need in this field for solutions for repositioning products with a facilitated adjustment.

To do this, the invention essentially proposes providing, for each block associated with a product to be repositioned, two stops, each associated with one of the positions of the block, with the actuator acting on the block for moving it against one or the other of these stops.

SUMMARY OF THE INVENTION

The invention thus has as its object a positioning device for grasping and modifying the position, within a support structure that it comprises, of a set of products for an industrial line that chain-handles these products, a device comprising, for at least one product to move in said support structure, a maneuvering unit comprising, on the one hand, a movable block interacting with said at least one product, and, on the other hand, an actuator defining the position of said block.

This device is characterized in that the at least one maneuvering unit also comprises a pair of adjustment stops between which the block shuttles, under the action of the actuator, in such a way as to move the at least one product in question.

The invention also has as its object a gripping device using such a positioning device, namely a gripping device for simultaneously taking multiple products into at least one column conveyed in an industrial line and then depositing them for packaging in a load or by packing in a case-type container.

This gripping device is characterized in that it comprises an above-described positioning device, provided for being mounted on a manipulator that moves the gripping device between a pick-up zone, where the products are picked up, and a deposition zone, where they are deposited after having been repositioned within the positioning device, with the movable block of the at least one maneuvering unit bearing at least one gripping means for grasping at least one product.

The invention also has as its object a method used by this positioning device, namely a process for repositioning products in an industrial line chain-handling these products, using a positioning device as defined above.

This process is characterized in that the movement of the products within the positioning device is performed by the movement, along first slides and between two adjustable stops, of at least one block that is dedicated to working with at least one product.

Finally, the invention also has as its object a transfer process implementing such a gripping device and using such a positioning process, namely a process for transferring products within a processing line where they are packaged, and this with an above-defined gripping device, with said products being picked up in a pick-up zone and deposited in a deposition zone.

This process is characterized in that it comprises a repositioning process as defined above, with the movement of the products within the positioning device being implemented during the transfer of the products from the pick-up zone to the deposition zone.

BRIEF DESCRIPTION OF THE DRAWINGS

The invention will be better understood using the description below, which is based on possible embodiments, explained in a way that is illustrative and in no way limiting, in reference to the accompanying figures, in which.

DETAILED DESCRIPTION OF THE INVENTION

The invention therefore first of all has as its object a positioning device 1 for grasping and modifying the position, within a support structure 2 that it comprises, of a set of products 3 for an industrial line chain-handling these products 3, a device comprising, for at least one product 3 to move in said support structure 2, a maneuvering unit 4 comprising, on the one hand, a movable block 5 that interacts with said at least one product 3, and, on the other hand, an actuator 6 that defines the position of said block 5.

The products 3 to be handled can be, for example, bottles, flasks, or the like, in a packaging line within which they are chain-handled for packing, loading, then palettization, etc. The products 3 can also be cases or other containers, shaped by a cardboard-case-shaping module, and then brought into the packaging zone by a suitable gripper. The packaging device 1 can therefore, in a non-limiting way, be used to grasp and extract products 3 from a stream or stock to deposit them elsewhere, with a predefined geometric configuration for pick-up and for deposition.

In a general way, the positioning device 1 may or may not be movable, in this sense that its support structure 2, within which the products 3 are moved, can itself be movable or not. A possible additional device can, for example, provide the products 3 to the positioning device 1, in the cases where it is immovable. In other embodiments, the positioning device 1 is movable and thus makes it possible not only to move the products 3 in relation to the device's support structure 2, but also to move the set of products 3 between two zones, in particular for a transfer or packing function.

The actuator 6 therefore has the effect of moving the block 5 within the support structure 2, with the block 5 in turn entraining at least one product 3. The products 3 therefore move within the positioning device 1 during its maneuvering.

According to the invention, the at least one maneuvering unit 4 also comprises a pair of adjustment stops 7 between which the block 5 shuttles, under the action of the actuator 6, in such a way as to move the at least one product 3 in question, in particular, in applications of the gripping-device 17 type, a pair of stops 7 comprising, on the one hand, a pick-up stop, which defines the position of the block 5 during the pick-up of the products 3, and, on the other hand, a deposition stop, which defines the position of the block 5 during the deposition of the products 3.

During the action of the positioning device 1, a block 5 therefore moves between two stops 7, under the action of the actuator 6, which rests in the support structure 2. As will also be described later, it is therefore the position of each of the stops 7 that defines the two end positions of the corresponding block 5: the one necessary for grasping the products 3 as they arrive, and the one desired for the subsequent deposition of the products 3.

According to a possible additional characteristic, the support structure 2 comprises, on the one hand, first slides 8 on which the block 5 of the at least one maneuvering unit 4 is mounted to move between two positions delimited by one of the adjustment stops 7 in each case, and, on the other hand, second slides 9 on which is mounted the corresponding pair of stops 7. In a general way, the first slides 8 can be formed by one and the same part; the second slides 9 can also be formed by one and the same part, with one and the same element also forming, for example, as many first slides 8 as second slides 9, which can bring about considerable structural simplifications.

The first slides 8 and second slides 9 are linear and parallel, with the blocks 5 being mounted to slide on the first slides 8. During use, the stops 7 are stationary, whereas they are movable and can move along the second slides 9 during the stages for preliminary adjustment of position.

According to another possible additional characteristic of the positioning device, it comprises a number of maneuvering units 4 to be able to handle simultaneously multiple products 3, with each maneuvering unit 4 being dedicated to the movement of at least one product 3, the blocks 5 all being mounted on the first slides 8, the pairs of adjustment stops 7 all being mounted on the second slides 9.

The first slides 8 and the second slides 9 are therefore linear, the blocks 5 thus being aligned along the direction in which the first slides 8 extend, each block 5 optionally able to be capable of handling a number of products 3 distributed perpendicularly in this direction, in particular with a means 10 for gripping by product 3, with the gripping means 10 therefore being aligned, for a block 5, perpendicular to the direction of the first slides 8.

According to another possible additional characteristic, the at least one maneuvering unit 4 also comprises, for each stop 7, a blocker 11, controlling the locking in position of said stop 7, in particular a blocker 11 in the form of a pneumatic jack. This blocker 11 makes it possible to lock the stop 7 in its position on the second slides 9, in such a way that it remains immovable despite the thrust against it of the block 5, under the action of the actuator 6. The blocker 11 is controlled and unlocked to allow an adjustment phase during which the corresponding stop 7 is moved along the second slide 8.

According to another possible additional characteristic, the actuator 6 of the at least one maneuvering unit 4 takes the form of a cylinder jack 12 and piston 13, which can switch between two end positions of the extended piston 13 or retracted piston 13, which are defined by the obstacles that oppose the movement of the piston 13, in particular by the stops 7 that block the movement of the block 5 that drives the actuator 6. The actuator 6 is therefore not itself controlled in position but is quite simply supplied with pressure until a stop surface opposes its continued movement.

In certain embodiments, the actuator 6 of the at least one maneuvering unit 4 takes the form of a cylinder jack 12 and piston 13, the one between the cylinder 12 and the piston 13 being secured to the corresponding block 5, the other being secured to one of the two stops 7, in particular the possible deposition stop.

According to another possible additional characteristic of the gripping device 1, it also comprises an adjustment means 14 for moving at least one stop 7 of the pair of stops 7 of the at least one maneuvering unit 4 in such a way as to adjust the amplitude of the movement of the corresponding block 5 between the two stops 7, with the adjustment means 14 having in particular a carriage 15 mounted on third slides 16, the stops 7, on the one hand, and the carriage 15, on the other hand, being designed for geometric cooperation allowing the carriage 15 to drive the stops 7 as it moves.

The carriage 15 has a controlled movement along the third slides 16, parallel to the first and second slides 8, 9.

The invention also relates to a use of such a positioning device 1, in the form of a gripping device 17. The invention thus also has as its object a gripping device 17 for taking multiple products 3 simultaneously into at least one column conveyed into an industrial line and then depositing them for packaging in a load or by packing in a case-type container 20.

According to the invention, this gripping device 17 comprises a positioning device 1 as described above, provided for being mounted on a manipulator 18 that moves the gripping device 17 between a pick-up zone, where the products 3 are picked up, and a deposition zone, where they are deposited after having been repositioned within the positioning device 1, with the movable block 5 of the at least one maneuvering unit 4 bearing at least one gripping means 10 for grasping at least one product 3. A gripping means 10 is, for example, a clamp or a suction cup, in particular multiple clamps or suction cups offset transversely for handling multiple products 3, optionally mounted on sliding shuttles, thus making it possible to move the products 3, within the gripping device 17, not only along the direction in which the first slide 8 that directs and guides the movement of the block 5 extends under the action of the actuator 6, but also in a perpendicular direction, using these shuttles.

The gripping device 17 is thus brought above products 3 waiting in the pick-up zone after or during their conveying, grasps the products 3 using gripping means 10, and then releases them in the deposition zone. Between the two, the arrangement of the products 3 is modified to correspond to the one that they are to have for the packing, taking into consideration possible differences between the cases 20 to be filled, in terms of dimensions and spacing in particular.

The invention also has as its object a process implementing the positioning device as described above, namely a process for repositioning products 3 in an industrial line chain-handling these products 3, using a positioning device 1 as described above. This chain-handling can be a packaging of said products 3, or at least a use of these products 3 for a packaging.

According to the invention, the movement of the products 3 within the positioning device 17 is performed by the movement, along first slides 8 and between two adjustable stops 7, of at least one block 5 dedicated to working with at least one product 3. The possibility of adjustment in position of each of the stops 7 independently contributes to the ease of use and the versatility of the unit, which can then very easily be adapted for handling different formats.

According to a possible additional characteristic of the process, it also comprises a preliminary adjustment stage essentially consisting in modifying the position, along second slides 9 on which it is mounted, of at least one stop 7 of at least one pair of stops 7 between which one or the block 5 shuttles. This change in position can be done in an automated and thus controllable way with precision by means of the stops 7 themselves, without requiring direct intervention by an operator.

In certain possible embodiments, the adjustment comes down to unlocking in position the stop 7 to be adjusted, and then in repositioning it along second slides 9, then in locking it in position again, once it has been positioned in a good location, with the locking of the stop 7 depending in particular on a blocker 11 of the pneumatic blocker type.

The invention also has as its object a process implementing the gripping device as described above, namely a process for transferring products 3 within a processing line where they are packaged, using a gripping device 17 as described, with said products 3 being picked up in a pick-up zone and deposited in a deposition zone, optionally in at least one case 20 placed first of all in the deposition zone.

According to the invention, this process comprises a process for repositioning products 3 as described above, with the movement of the products 3 within the positioning device 1 being implemented during the transfer of the products 3 from the pick-up zone to the deposition zone. The positioning device 1 is then, of course, returned to the pick-up zone for the next cycle. This process therefore ensures the movement of a product group between two zones, but also the reconfiguration of said group.

In the embodiment illustrated in the accompanying figures, the positioning device 1 has a support structure 2 on which the set of primary components is mounted. Actually, on this support structure 2, on the one hand, the first slides 8, for the blocks 5, are mounted, and, on the other hand, the second slides 9, for the stops 7, are mounted.

It will be understood, of course, that both the first slides 8 and the second slides 9 can take the form of a guide actually implemented as a single part, and even one and the same element for forming simultaneously both the first slides 8 and the second slides 9.

Figure 1:
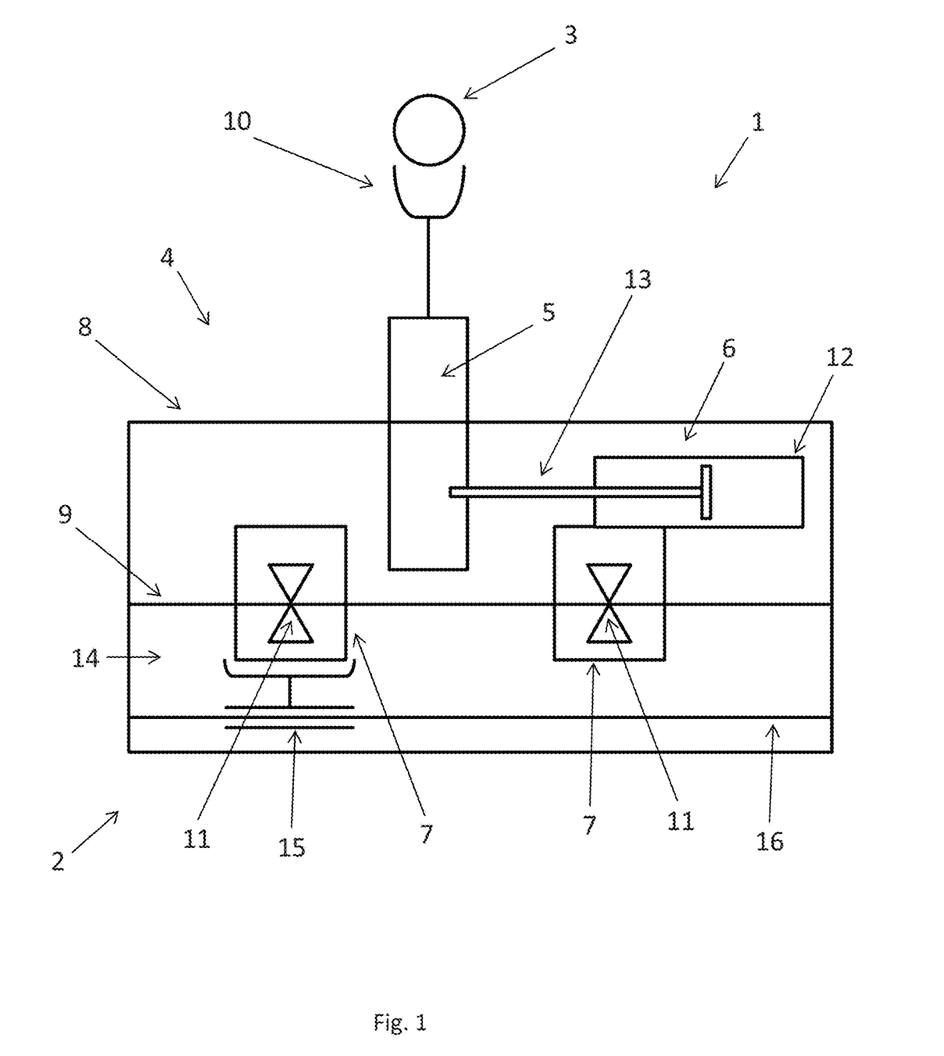
FIG. 1 shows the general principle with a block for handling a product.
Figure 3:
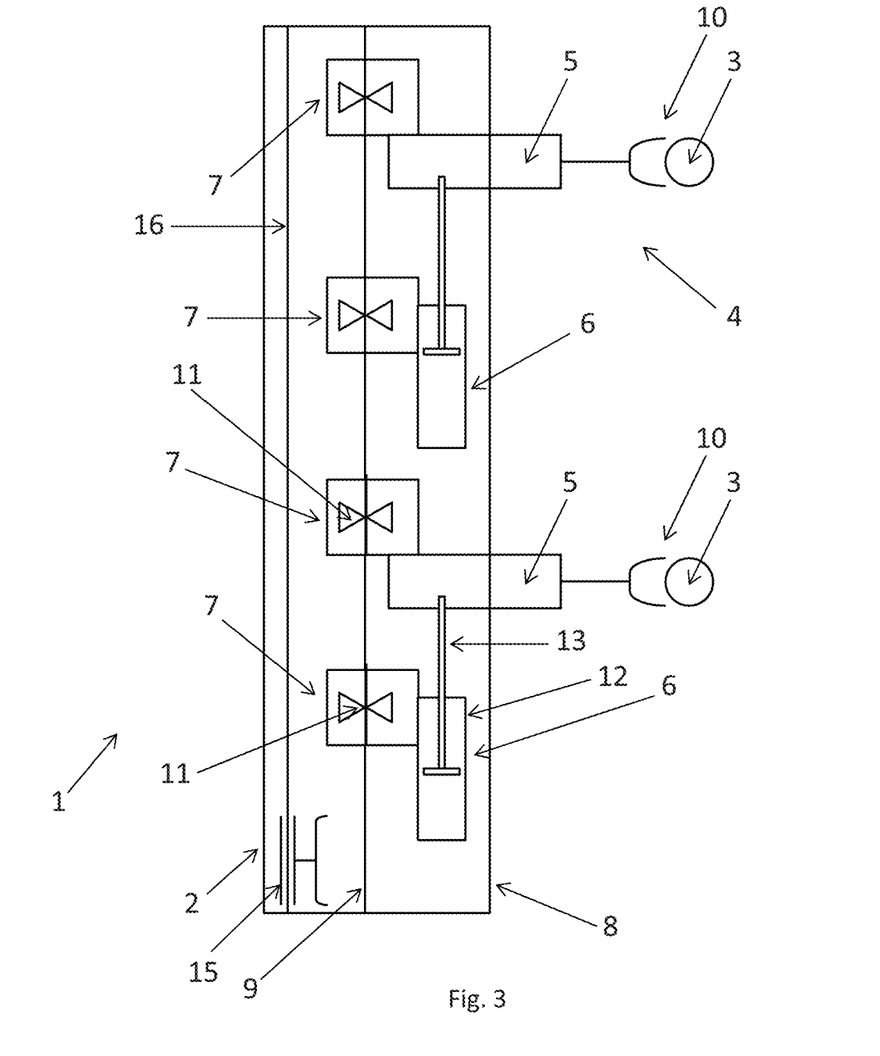
FIGS. 3 and 4 show a positioning device respectively in the two possible end configurations.
Figure 4:
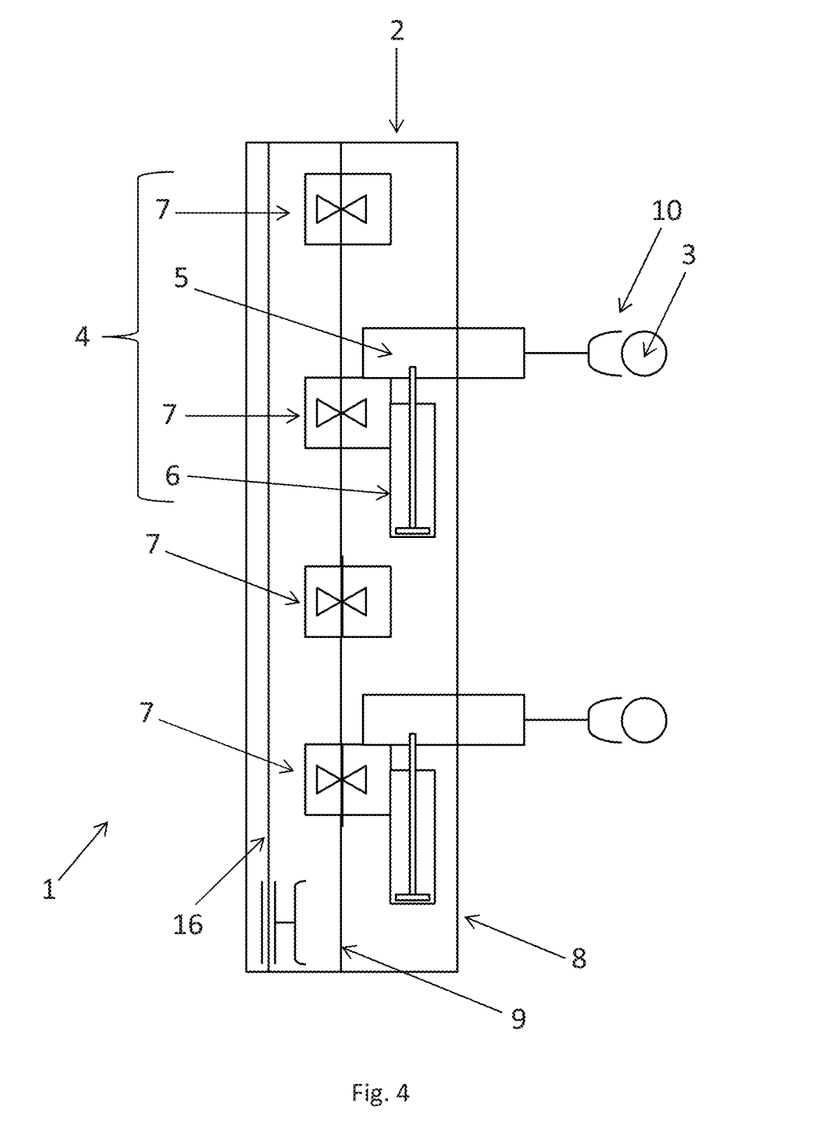

FIG. 1 illustrates a particular case for working with a single product 3; FIGS. 3 and 4 show cases where the positioning device 8 can work with two products 3.

In a general way, it is, of course, conceivable that a block 5 be provided for working with multiple products 3, in particular multiple products 3 distributed perpendicularly to the first slides 8. The products 3 can be, for example, flasks, bottles, or the like, initially circulating in a conveying direction 19, on a belt that forms an essentially horizontal surface. The series of blocks 5 can then be provided to extend in the conveying direction 19, and initially to match the spacing of the products 3 at this pick-up location. Each block 5 therefore has at least one gripping means 10 for grasping a product 5. Preferably, each block 5 has a number of such gripping means 10, which are distributed transversely to the series of blocks 5. The gripping means 10 then form a matrix, with the gripping means 10 of the same block 5 extending transversely at the axis in which the blocks 5 extend, these blocks being aligned with the conveying direction 19 when the positioning device 1 comes to grasp the products 3.

Such a configuration, with a matrix of gripping means 10 extending in two directions, thus makes it possible to grasp successively, with the gripping means 10 of the same row for the different blocks 5, groups of products 3, each group forming a section of the column of products 3 conveyed and a column of the future lot. It is also optionally possible to grasp simultaneously all of the groups and therefore a lot, in the particular cases where the products 3 already come in multiple parallel columns.

In certain configurations, a block 5 bears multiple gripping means 10, distributed and movable transversely to the first and second slides 8, 9. This movability makes it possible in addition to move the products 3 transversely to said slides and therefore transversely in relation to the initial conveying direction 19. The block 5 then contains the suitable moving parts associated with the gripping means 10 mounted thereon.

It will also be noted that in an advantageous way, the at least one gripping means 10 of the at least one block 5 can be retracted, i.e., put out of operation, to then adjust the capacity or the format of the positioning device 1 in terms of the number of products 3, or else geometric configuration. The retracted gripping means 10, in particular reassembled in the heart of the support structure 2, then cannot grasp the product 3. It is conceivable, for example, to mount the gripping means 10 on a piloted jack, whose retracted or extended position of the rod represents a retracted position and therefore the shutdown of said gripping means 10.

Thus, each block 5 is associated with at least one product 3 and is also movable in the support structure 2, along the direction of the first slides 8 on which the blocks 5 are mounted beside one another. The successive blocks 5 therefore extend in a direction that corresponds to the first slides 8, with the latter corresponding to the conveying direction 19 once opposite the products 3 to be grasped.

It will therefore be understood that, thanks to the movement of the blocks 5 that bear them, the products 3 are also moved within the support structure 2 since they undergo, parallel to the first slides 8, the same movement as the blocks 5. It is therefore possible to reposition the products 3 in the support structure 2 and therefore also to reposition them in relation to one another, if necessary.

The movement of a block 5 along the first slides 8 is ensured by an actuator 6. This actuator 6 is preferably of the variable-length type, with, during operation, a stationary part in relation to the support structure 2, with the block 5 that is corresponding and that is to be moved being secured to another part of said actuator 6.

The amplitude of the movement of the movable block 5 is delimited by two stops 7, between which it moves under the action of the actuator 6. The latter has the particular feature of being able to switch in the sense that it moves the block 5 until it arrives at a stop and therefore does not itself ensure the final position of the block 5. It is the change in position of a stop 7, from the other or of the two, which modifies the end positions between which the corresponding block 5 shuttles.

The actuator 6, associated with a particular block 5, is preferably of the pneumatic type controlled by a distributor that can switch, providing the pressure in one or the other chamber of said actuator 6.

The block 5 therefore shuttles between these two stops 7 for repositioning the products 3. The position of the block 5 against one of them represents the position that it is to have before repositioning the products 3, in particular for grasping them by matching the space between them in the conveying direction 19. The position of the block 5 against the other stop 7 represents the position that it is to have once the products 3 are repositioned. In a particular application where the support structure 2 is mounted for grasping products 3 that circulate and for bringing them into at least one case 20 for packaging, the stop 7 against which the block 5 is to be located for grasping the products 3 is called a pick-up stop, whereas the stop 7 against which the block 5 is located after repositioning is called a deposition stop. When the at least one block 5 is against the deposition stop, the at least one corresponding product 3 is located in the expected position so that it is deposited.

It is understood that during operation, the stops 7 are stationary in relation to the support structure 2. Mounted on second slides 9, they can be moved in an adjustment phase for modifying one or the other of the positions that the corresponding block 5 is to take during the pick-up or the deposition of the product 3.

As in the accompanying figures, the actuator 6 can be directly attached to one of the stops 7; it thus naturally follows the adjustments in position. The actuator 6 has a body or cylinder 12 in which a piston 13 shuttles. The cylinder 12 is then attached to a stop 7, either the deposition stop or the pick-up stop, whereas the piston 13 is attached to the block 5, which simplifies the structure and makes possible the embodiment of an autonomous module. Of course, other mounting forms are possible, such as the attachment of the cylinder 12 to the movable body 5 and the complementary attachment of the piston 13 to a stop 7.

Thus, the amplitude of the movement of each block 5 can be adjusted independently and in a very easy manner since it is necessary only to move one, the other, or the two stops 7 between which the block 5 navigates during use. The stops 7 therefore have a stationary but adjustable position in the support structure 2, on the second slides 9. Once adjusted in position, a blocker 11 is implemented. Such a blocker 11 is associated with at least one stop 7 and locks its position along the second slides 9. The blocker 11 is locked by default, and it is the input of energy that unlocks it. After having placed the stop 7 in the desired location, the associated blocker 11 locks it in position to prevent any other possibility of movement. Naturally, for the purpose of an adjustment stage and therefore a change in position of the stop 7, the associated blocker 11 is maneuvered to unlock the stop 7 in position to allow it to be moved.

As FIG. 1 shows, the positioning device 1 is equipped with third slides 16 over which shuttles a carriage 15 that can work with the stops 7 for, once they are free in position along the second slides 9, moving them to the desired position. Once the stop 7 is positioned in the proper location, the blocker 11 locks the stop 7. The adjustment can then be carried out in the same manner for another stop 7. In a general way, the carriage 15 works with at least one stop 7 for driving it in movement. The carriage 15 is therefore driven in movement along the third slides 16 during the adjustment stage that optionally precedes a manufacturing cycle. The stops 7 therefore cannot move in an autonomous way but are driven in their adjustment movement by a single controlled-position carriage 15. Unlike actuators 6 that can switch positions between two stop surfaces, the carriage 15 can, under the action of a suitable driving device, take any position along the third slides 16 for, on the one hand, seeking a stop 7, and, on the other hand, accessing the location where the stop 7 is to be deposited. The freedom of positioning of the adjustment carriage 15 makes possible an adjustment in position that is simple and that can be done for each parameter of the repositioning of the products 3. During the adjustment stage, all that actually has to be done is to move the stops 7 one after the other using the controlled carriage 15, after an unlocking and before a locking. The carriage 15 is therefore moved into position in a controlled way during the adjustment stage.

The carriage 15 is preferably mounted on a piloted jack, which makes it possible to be momentarily engaged mechanically with the stop 7 to be handled, in a form-fitting manner. Once engaged, the carriage 15 drives the stop 7 in its movement. The engagement or the disengagement of the carriage 15 in relation to the stop 7 therefore depends on the retracted or extended state of said jack.

The positioning device 1 is thus structurally simple since it is in particular based essentially on slides parallel to one another:

First slides 8, for the necessary shuttling of blocks 5 for the repositioning of products 3;

Second slides 9, for the necessary shuttling of stops 7 for the adjustment of amplitudes and end positions of the blocks 5 between them, and Third slides 16, for shuttling the controlled-movement carriage 15 that drives the stops 7 and repositions them.

The blocks 5 and the stops 7 optionally can be mounted together on the same linear guide element of the slide type, which then in a non-distinctive way forms both the first slides 8 and the second slides 9. The first slides 8 and the second slides 9 are then obtained by one and the same linear guide means, on which are mounted both the blocks 5 and the stops 7.

In addition, optionally a single carriage 15 is enough to move all of the stops 7. Of course, in absolute terms, multiple carriages 15 can be used simultaneously to reduce the duration of the adjustment. In addition, since the movement of each block 5 is conditioned in each case by two movable stops 7, the adjustment is independent for each block 5, and the repositioning of the products 3 within the support structure 2 optionally makes it possible to reposition the products 3 between them and to change the geometric configuration thereof, such as, for example, to group them by lots, or simply to have different final spacing between the products 3, etc.

Figure 2:
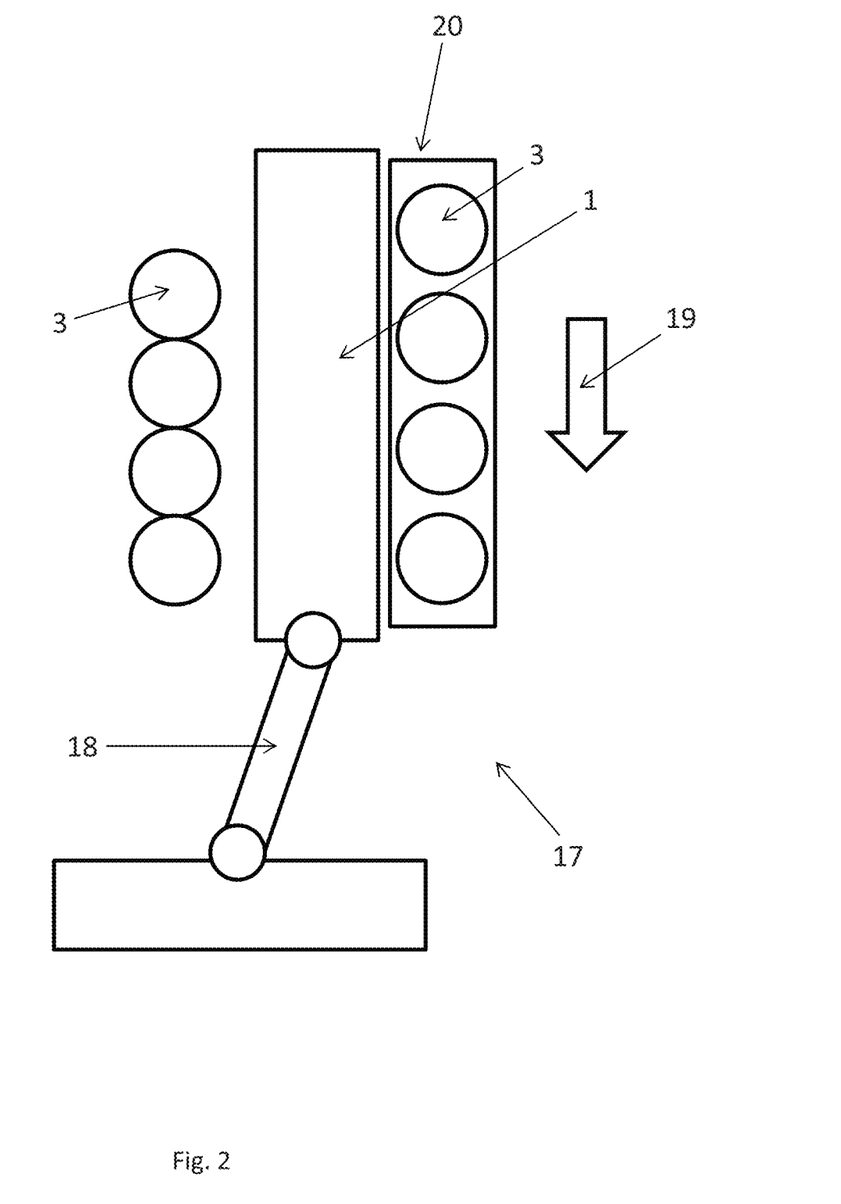
FIG. 2 shows an application in the form of a packing gripper robot.

FIG. 2 illustrates a configuration where the positioning device 1 is used as a gripping device 17, which grasps products 3 of the flask or bottle type, which move over a packaging line in a conveying direction 19. The gripping device 17 is positioned above the products 3 upon stopping or during shuttling, and grasps them by their upper part for then depositing them in a case 20. In such a configuration, the positioning device 1 is mounted as a tool at the end of a multi-axis manipulator robot 18. The products 3 arrive in the form of a continuous stream, and the gripping device 17 is then used to grasp them and to deposit them in a packaging case 20, box or the like, for example obtained by folding a cardboard sheet. The space between the products 3 that arrive in the conveying direction 19 to be grasped depends on the operation of the machine upstream. The products 3 can thus be in contact with one another or spaced by a more or less regular span.

For grasping products 3 that arrive, the corresponding blocks 5 are therefore positioned against the pick-up stop 7 in such a way as to match the spacing of the products 3 to be grasped. Once the products 3 are grasped using various gripping means 10, they are moved toward the deposition zone using the movement of the manipulator 18. During this travel, they are repositioned within the positioning device 1, using the action of the actuators 6 that will move the blocks 5 that transport the products 3 up to the deposition stops 7. The spacing between the products 3 is then modified to be adapted to the configuration that the products 3 are to take in the case. After their repositioning, the gripping device 17 quite simply deposits the products 3 in the at least one case 20, in the deposition zone. Thanks to the invention, the positioning device 1 can easily be adapted to all of the packing configurations.

The products 3 handled simultaneously by the gripping device 17 can be deposited in multiple cases 20 simultaneously, with these cases 20 optionally being configurations that are different from one another, for example with braces or spacers that are different in each case. The positioning device 1 then ensures the necessary versatility for also adapting to this type of situation, since each block 5 can be adjusted independently, and consideration can then be given in particular to configurations that are expected in each case 20, but also to provide more significant space between the lots dedicated to different cases 20, due to the thicknesses created by the walls of the cases 20 against one another.

FIGS. 3 and 4 are tied to the same embodiment and show the two possible states based on the position of the blocks against one or the other of the stops 7. FIG. 4 shows in particular that the movement of the two blocks 5 is not necessarily of the same amplitude, which quite simply comes from a different adjustment between a stop 5 of a maneuvering unit 4 in relation to the corresponding stop 5 for the other maneuvering unit 4.

Thanks to the invention, it is thus possible to adjust, in a very simple and nevertheless effective way, a positioning device that has as its object to change the position of products 3 in relation to a support structure 2 that maneuvers them at least temporarily. In addition, the possible adjustments, in terms of amplitude of movement for each product, of the initial position and the final position, are very numerous.

Although the description above is based on particular embodiments, it is in no way limiting of the scope of the invention, and modifications can be provided, in particular by substitution of equivalent techniques or by a different combination of all or part of the characteristics developed above.

The invention claimed is:

1. A positioning device (1) for grasping and modifying a position of a set of products (3), for an industrial line that chain-handles said products, comprising:
   a support structure; and
   a maneuvering unit for moving at least one product of said products within said support structure,
   the maneuvering unit including a movable block configured to interact with said at least one product, and an actuator defining a position of said movable block,
   wherein the maneuvering unit also comprises a pair of adjustment stops, between which the movable block shuttles under action of the actuator, and
   wherein the support structure includes
      first slides formed by one and a same first part, the movable block of the at least one maneuvering unit being mounted on said first slides for movement between two positions, and
      second slides formed by one and a same second part, on which are mounted the adjustment stops, the movement of said movable block delimited by one of the adjustment stops.

2. The device according to claim 1, including a plurality of said maneuvering units, each one of said maneuvering units being dedicated to movement of a product of said set of products, the movable blocks of each of said maneuvering units being mounted on the first slides, and the adjustment stops of each of said maneuvering units being mounted on the second slides.

3. The device according to claim 1, wherein the at least one maneuvering unit also includes, for each one of the adjustment stops, a blocker that controls a locking in position of said adjustment stop on the second slides.

4. The device according to claim 1, wherein the actuator of the at least one maneuvering unit is comprised of a cylinder jack and piston, said actuator being configured to switch between an extended piston position and a retracted piston position, said extended piston position and said retracted piston position defined by obstacles that oppose a movement of the piston.

5. The device according to claim 1,
   wherein the actuator of the at least one maneuvering unit is comprised of a cylinder jack and piston,
   where one of the cylinder and the piston is secured to a corresponding movable block, and the other of the cylinder and the piston is secured to one of the adjustment stops.

6. The device according to claim 1, further comprising:
   an adjustment means for moving at least one adjustment stop of the pair of adjustment stops of the at least one maneuvering unit.

7. A gripping device (17) for simultaneously taking multiple products (3) into at least one column conveyed in an industrial line and for then depositing the multiple products for packaging in a load or by packing in a case-type container (20), comprising:
   the positioning device according to claim 1; and
   a manipulator, the positioning device being mounted thereon, that moves between a pick-up zone where the multiple products are picked up, and a deposition zone where the multiple products are deposited after having been repositioned within the positioning device, wherein the movable block of the at least one maneuvering unit of the positioning device has thereon at least one gripping means for grasping at least one product of the multiple products.

8. A product positioning process in an industrial line for chain-handling multiple products (3), comprising:
providing a positioning device according to claim 1; and
causing the at least one movable block of the maneuvering unit of the positioning device to move along the first slides of the positioning device and between the adjustment stops of the positioning device,
the at least one movable block being dedicated to working with at least one product of the multiple products.

9. The process according to claim 8, further comprising:
a preliminary adjustment wherein a position is modified of at least one adjustment stop of the adjustment stops along the second slides on which the at least one adjustment stop is mounted.

10. The process according to claim 9, where the preliminary adjustment comprises unlocking the at least one adjustment stop, then repositioning the at least one adjustment stop along the second slides, and then locking the at least one adjustment stop.

11. A process for transferring products (3) within a processing line where the products are packaged, comprising:
providing a gripping device (17) for simultaneously taking multiple products into at least one column conveyed in an industrial line and for then depositing the multiple products for packaging in a load or by packing in a case-type container, the gripping device including a positioning device (1), which has a support structure (2) and a maneuvering unit (4) for moving at least one product of said products within said support structure, the maneuvering unit including a movable block configured to interact with said at least one product, and an actuator defining a the position of said movable block, the maneuvering unit also comprising a pair of adjustment stops between which the movable block shuttles, under the action of the actuator, and the support structure including first slides formed by one and a same first part, the movable block of the at least one maneuvering unit being mounted on each one of said first slides for movement between two positions, and second slides formed by one and a same second part, on which are mounted the adjustment stops, the movement of said movable block delimited by one of the adjustment stops,
and a manipulator (18), the positioning device being mounted thereon, that moves between a pick-up zone where the multiple products are picked up, and a deposition zone where the multiple products are deposited after having been repositioned within the positioning device,
the movable block of the at least one maneuvering unit has thereon at least one gripping means for grasping at least one product;
causing the at least one movable block of the maneuvering unit of the positioning device to move along the first slides of the positioning device and between the adjustment stops of the positioning device,
a movement of the multiple products by the positioning device being implemented during a transfer of the multiple products from the pick-up zone to the deposition zone.

* * * * *